Figure 1:
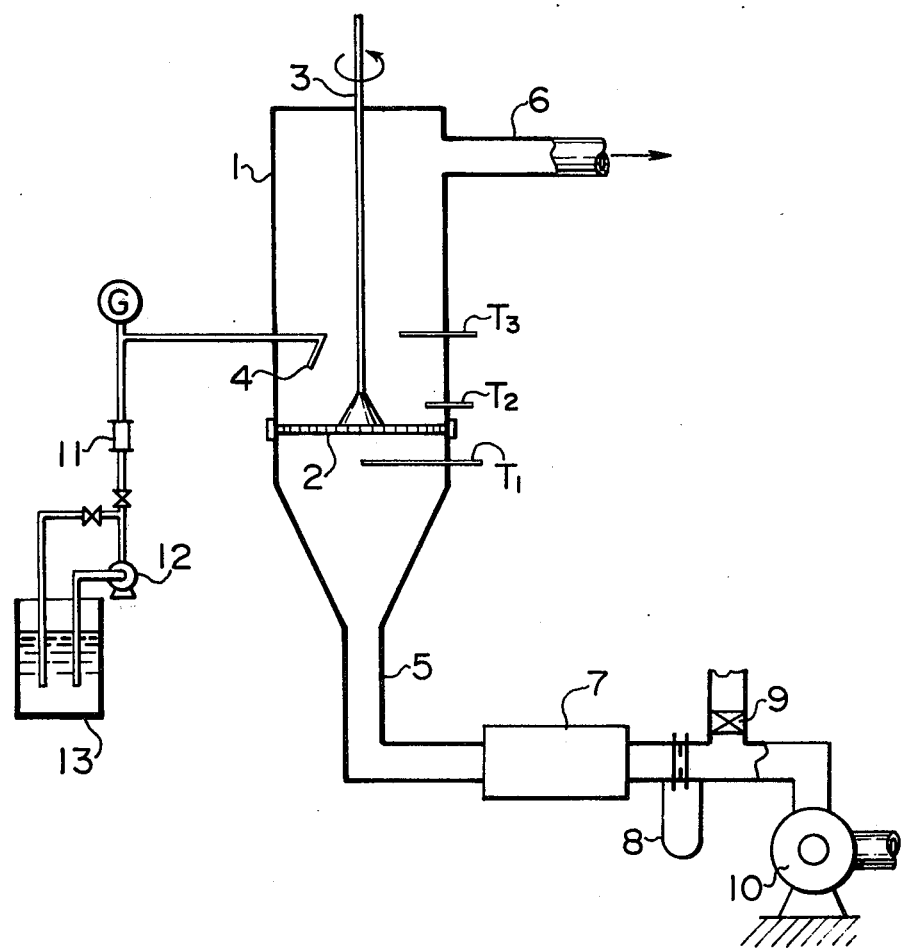

United States Patent
Fujita et al.

[11] 4,019,890
[45] Apr. 26, 1977

[54] METHOD FOR PRODUCING COATED FERTILIZER

[75] Inventors: Toshio Fujita; Chigo Takahashi; Masanari Ohshima, all of Fujishi; Tsunezo Ushioda, Tokyoto; Hirozo Shimizu, Fujishi, all of Japan

[73] Assignee: Chissoasahi Fertilizer Co., Ltd., Tokyoto, Japan

[22] Filed: Dec. 3, 1974

[21] Appl. No.: 529,125

[30] Foreign Application Priority Data

Dec. 28, 1973 Japan .................. 49-144724

[52] U.S. Cl. .................. 71/64 F; 71/35; 427/212
[51] Int. Cl.² .................. C05C 5/02
[58] Field of Search .......... 71/29, 30, 64 E, 64 F, 71/35, 36; 427/212, 221

[56] References Cited
UNITED STATES PATENTS

| | | | |
|---|---|---|---|
| 3,259,482 | 5/1966 | Hansen | 427/212 X |
| 3,276,857 | 10/1966 | Stansbury | 71/64 E |
| 3,372,019 | 3/1968 | Fox | 71/64 F |
| 3,388,990 | 6/1968 | Maruta et al. | 71/64 F |
| 3,734,707 | 5/1973 | Seymour | 71/30 |
| 3,873,734 | 3/1975 | Higgins et al. | 71/29 X |

FOREIGN PATENTS OR APPLICATIONS 46-42564 12/1971 Japan .................. 71/64 F

*Primary Examiner*—Frank A. Spear, Jr.
*Assistant Examiner*—Robert H. Spitzer
*Attorney, Agent, or Firm*—Armstrong, Nikaido & Marmelstein

[57] ABSTRACT

Granular slow-releasing fertilizers completely coated with water-resisting resin are produced in such a manner that the coated granules do not stick together, through one step operation by spraying a solution of the resin which has the property capable of maintaining the solution state while it is hot but turning into jelly-like gel when it is cooled, on granules of fertilizer and drying the said granules with a high speed drying hot air on the spot upon being sprayed with the solution of the resin.

15 Claims, 4 Drawing Figures

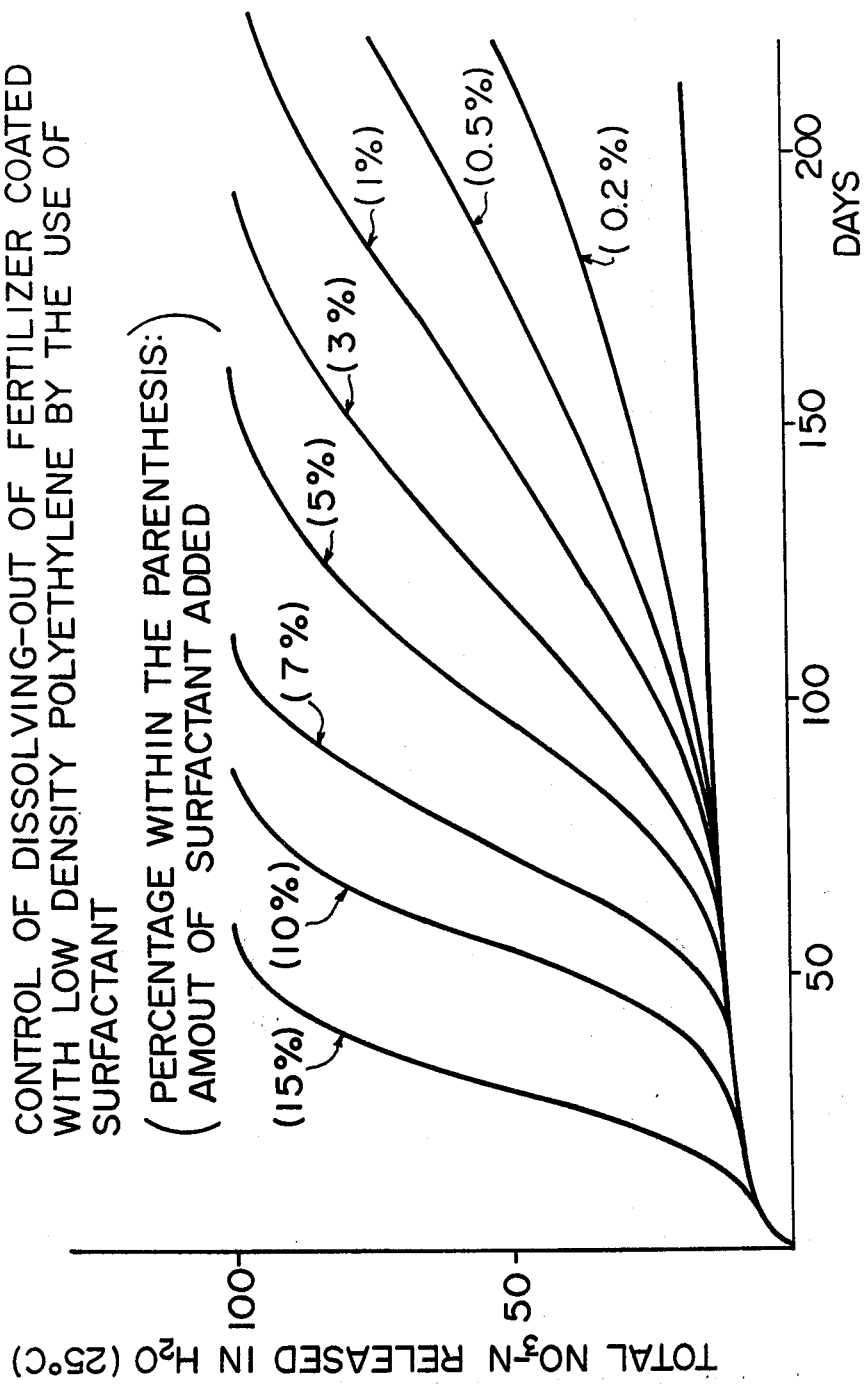

METHOD FOR PRODUCING COATED FERTILIZER

DESCRIPTION OF THE INVENTION

From the requirement of the modernization of farming, fertilizers which have properties suitable for mechanization and labour saving have been sought for. As fertilizers capable of meeting the above-mentioned purpose, liquid fertilizers and slow-releasing fertilizers have been developed and are appearing in the market.

The fertilizers which have been developed as slow-releasing fertilizers can be roughly classified into following three kinds; (1) fertilizers whose components have been turned to give difficulty soluble or difficulty decomposable properties through a chemical way, (2) fertilizers which are turned into difficulty soluble form by some methods for example incorporation of inorganic substances such as cements or the like or organic substances such as wax or the like and (3) fertilizers which are coated with a water-resisting substance.

The fertilizers having the form of (1) include organic nitrogen-containing compounds such as crotylidene diurea (CDU) obtained by the condensation of urea and aldehyde, isobutylidene diurea (IBDU), urea form (UF), oxamide, etc. and difficulty soluble salts such as ammonium magnesium phosphates, etc. The release of effective component of this form of fertilizer is influenced a great deal by soil microorganisms, soil water and soil pH and hence the degree of release varies according to kind and water content of soil. So it is generally difficult to control the dissolution in accordance with the requirement of plants.

The fertilizers having forms (2) and (3) have advantage in that the fertilizers which have been heretofore used widely can be used as raw materials as they are. Although the dissolution control of the fertilizer having the form (2) is carried out by varying the kind and addition amount of solidifying binder, finding of a suitable binder is rather difficult under the condition that it must be cheap and available in a large amount. Moreover the form (2) has a drawback in the point that dissolution control cannot be performed freely due to its inherent property. The fertilizers of the form (3) may have the possibility of being more freely controlled in dissolution, but if coating is not perfect and contains even a slight extent of pinholes, water-soluble components dissolve out within a short time and if coating is perfect on the contrary, dissolution does not take place, etc. Thus, the fertilizers of the form (3) still have problems which have not been solved yet in the control of dissolving rate.

As the methods for producing coated fertilizers which have found their practical application, a multiple layer coating method which uses a thermosetting resin and sulfur coating method which utilizes molten sulfur can be mentioned. Although in the former case the control of dissolving rate is made by the pinholes created during the process of production and remaining thereafter and in the latter case, by incorporating paraffin or the like and allowing the coating to be decomposed by soil microorganisms, optional control is not possible in both the cases.

In order to control the dissolving property of coated fertilizers freely, a perfect coating should be made because fine pinholes can be made for the purpose of dissolving control relatively easily if perfect coating with uniform, very thin film is once made. In order to provide perfect coating for controlling dissolving property, it is necessary to dissolve in a solvent a coating material which is superior in resistance to water, moisture-impermeability and resistance to osmotic pressure, and to effect coating in the form of solution. However, the maximum defect of the solution method is the mutual agglomeration of fertilizer granules during coating treatment and on this account, it has been regarded that individual granules cannot be coated by the solution method.

Accordingly, it is an object of the present invention to provide a method for producing completely coated granular fertilizer, using a solution of highly water-resistant resin, in such a manner that the coated granules do not stick together and through one step.

It is another object of the present invention to provide a method for producing granular fertilizers completely coated with resin films wherein, however, control of dissolution of fertilizer component can be made by adding a necessary additive for forming pinholes.

These objects and other advantages can be attained by the method of the present invention. The present invention lies in a method for producing slow releasing granular fertilizer fully coated with water-resisting, transparent, lustrous layer of resin in such a manner that the coated granules do not stick together, which comprises spraying a solution of a thermoplastic resin in a hydrocarbon or chlorinated hydrocarbon solvent, upon fertilizer granules, and drying said fertilizer granules upon being sprayed with said solution, continuously and immediately on the spot with a high speed hot air, said solution having the property of capable of forming a solution while it is hot but turning into jelly-like gel when it is cooled.

When thermoplastic resins are dissolved in solvents and used for the purpose of coating, the following three cases occur according to the combination of resins and solvents: (1) a case where a resin and a solvent show a good compatability and a uniform solution is obtained, (2) a case where no solution can be formed at all and (3) a case where a resin can be dissolved in a solvent only at an elevated temperature. When used as a coating solution, a resin must be dissolved in a solution; hence the case of (2) is out of the question. Since the case of (1) provides a most stable solution and is considered to be most preferable, various coating methods have been proposed. However, the viscosity of resultant solution is usually very high, and coating of individual granules cannot be made due to sticking or agglomeration during the step of coating, and coating of individual granules can be made by the simultaneous use of fine powdered substances for avoiding stickiness, and preventing agglomeration. However, perfect coating of individual granules has not succeeded according to this method, for the above reasons. In the case of (3), a solution is formed while it is hot but a solution cannot be formed when it is cold, and when a hot solution is cooled two cases occur. A case where the resin deposits wholly throughout a solution and the solution loses fluidity while holding a solvent showing jelly-like form and another case where a resin and a solvent separate into two phases clearly.

The resin solutions used in the method of the present invention are those obtained from a combination of resin and a solvent in which a solution is formed while it is hot but resin deposits and turns into jelly-like gel when it is cold. A representative example of this case is a solution consisting of a polyolefin and a solvent of petroleum hydrocarbon or chlorinated hydrocarbon and this is a most preferable solution for the present invention. It has been anticipated that this kind of solution would be entirely inadequate for the coating of fertilizer granules because the coating carried out by using this solution would bring about deposit and gelation of resin component on the surface of particles during coating step and hence no film is formed. However, it has been found that even when the coating of individual granules is carried out by using the solution having the property of forming jelly-like gel when it is cooled (hereinafter referred to a gel-forming solution), there is an advantage that any sticking or agglomeration which has been a problem in the past does not occur.

In the operation of coating of granular fertilizers, the fertilizer particles are usually mixed by rolling motion in a revolving drum, a revolving pan or the like or by fluidizaton in a fluidized bed and a liquefied coating material is added in spray form. If the liquefied coating material is a molten substance, solidification of granule surface is carried out by cooling and if it is a solution, drying is carried out by hot wind. During this course of step, a common solution is concentrated and increase of stickiness and agglomeration appear. In case of gel-forming solution, gelation temperature is elevated with the increase of concentration, and gelation always occurs irrespective of temperature, and film-form coating is not attained by common drying. Capsules formed by common drying are nothing but piled up resin powders containing some amount of solvent and hence it is impossible to suppress the dissolution of fertilizer practically even when a ratio of coating is increased. When the movement of granules becomes vigorous, the once-adhered coating separates by the collision of granules to each other.

The gelation due to phase separation in solution seems to occur within an infinitesimal time in case of coating with a gel-forming resin solution but there is always a certain time allowance until gel is actually formed and if drying is performed instantaneously within this infinitesimal time, granular fertilizers can be encapsulated with a dense, uniform film having a small moisture-permeability, and granular fertilizers practically close to perfect coating can be obtained without forming agglomeration.

The characteristic effectiveness of the method of the present invention lies in that no agglomeration occurs even when a very large amount of solution is added within a short time and efficient coating of individual granules can be made. This effectiveness of the present invention is attained by adding a resin solution having a high gelation property in spray form to fertilizer granules while the solution is maintained at a temperature higher than the phase separation temperature and drying the granules with a high speed stream of hot wind for drying, continuously and immediately on the spot hit with spray.

Namely, a hot solution of resin having no phase separation is sprayed directly on the surface of granules and at the same time instantaneous drying is applied with a high speed stream of hot wind for drying, and there is allowed no time gap between spraying and drying.

The most important conditions in the production according to the method of the present invention are stream speed of hot wind and temperature of granules. Stream speed of hot wind should be 5 m/sec. or higher, preferably 15 m/sec. or higher on the spot or zone (or in situ) of fertilizer granules sprayed with said solutions. The higher the speed, the better the result. A suitable temperature of granules varies according to the properties of solution, and in cases of the solutions of polyolefins or polyvinylidene chloride in hydrocarbon or chlorinated hydrocarbon solvents which easily form gel and are preferable in the practice of the present invention, a temperature in the range of 40°–90° C, particularly 60°–70° C is preferable. If a temperature is lower than 30°–40° C, gelation occurs and dense transparent film coating cannot be obtained. In general, when a solvent having a boiling point higher than the gelation point of the solution by 60°–80° C is used, it is preferable to keep the temperature of granules in the range of temperature higher than the gelation point by 10°–30° C. However, when the boiling point of solvent and the gelation point of solution are close to each other, it is possible to use a lower temperature than the above-mentioned. To be strict since a latent heat of vaporization of solvent has influence, some correction may be necessary in the practice.

The apparatus used in the practice of the present invention, consists substantially of a principal drying part which performs instantaneous drying and a supplementary drying part which removes a certain extent of remaining solvent. Since drying is performed at the former part to such an extent that no more phase separation occurs, only a simple drying is sufficient at the latter part and there is no necessary condition such as speed of wind, etc. there.

When the method of the present invention is carried out in a fluidized bed (though a preferable wind speed of 15 m/sec. or higher is only possible with relatively larger granules in case of fluidized bed and stabilized operation is practically difficult), and if a solution is sprayed upon the whole top surface of the fluidized bed, the uppermost part of the fluidized bed performs the principal drying part. It is necessary to satisfy the condition of instantaneous drying on this surface. If a solution is added to only a part of this top part, that spot of the top part becomes the principle drying part and other drying parts become supplementary drying part. Such drying is not preferable because efficiency is very poor.

If a resin solution is added to an opening which is provided at a part of a multi-perforated plate of a fluidized bed apparatus and through which a high speed stream of hot wind for drying is ejected to form a forced circulation type fluidized bed, or if a resin solution is added to the central opened part of a spouted bed column which has no multi-perforated plate and through which part a spout of hot wind for drying, is ejected, the principal drying part is formed in the longitudinal direction of such granule-moving phase.

When the present invention is put into practice commercially, an easy solvent recovery is necessary, and for the purpose it is necessary to evaporate a large amount of solvent by using as small an amount of hot wind as possible. Thus a high speed stream of hot wind for drying should be concentrated onto the principal drying part and a resin solution should be added thereto. In this regard a spouted bed is a most suitable apparatus of the practice of the present invention. A spouted bed has limiting conditions in the diameter of the cylindrical section of spouted bed, the diameter of gas inlet orifice for forming spout, the diameter of granules, the density of granules, the amount of spouting fluid, etc. Thus it is a drawback of this apparatus that optional conditions cannot be selected, but it will be sufficient if a wind speed of 15–40 m/sec. is selected as a speed of hot wind stream of the principle drying part for fertilizer granules having size of 2–5 mm in the spouted bed of the method of the present invention. If a solution of polyolefin or the like in tetrachloroethylene which forms jelly-like gel easily is treated under the above-mentioned conditions and apparatus, it is possible to evaporate 300–400 g of the solvent per 1 kg of air and there is no need of providing a subsequent drying step due to decreasing rate. In the method of the present invention, it is possible to select combinations from various resins and various solvents under the condition that gel-forming property is maintained. However, if a temperature of fertilizer granules during the operation of coating is too high, this becomes the origin for inducing various troubles such as thermal decomposition of fertilizer component, melt-adhesion of resin attached to the fertilizer, or the like, while if a temperature is too low, coating time is too prolonged and a lower boiling solvent is wastefully required, and hence unless granules contain a substance particularly weak to heat, such a lower temperature is not preferable. On this account it is advisable to use a gel-forming solution which can effect coating by maintaining the granule temperature during the coating operation at 40°–90° C, preferably 60°–80° C, in the method of the present invention. Thus it is preferable to select a solution having a gelation temperature of 30° C or higher, preferably 50° C or higher, in the case of 5% resin solution and a solvent having a boiling point in the range of 90°–150° C. A gelation temperature lower than 30° C is not preferable because it causes agglomeration of granules during coating operation, and a lower boiling point solvent having a boiling point lower than the phase separation temperature is not useful because preparation of solution cannot be made under the atmospheric pressure and dissolution must be be under an elevated pressure. Thus it is preferable to use a solvent whose boiling point is higher than the phase separation temperature, by 20° C or higher, preferably more than 40° C or higher. However, if the boiling point of solvent is too high, efficient preparation is not possible and there are often cases where evaporation velocity becomes too small and gelated films cannot be obtained even according to the present invention.

The solutions useful in the method of the present invention include those obtained by a combination of a polyolefin and a petroleum hydrocarbon such as benzene, toluene, xylene, solvent naphtha or the like or a chlorinated hydrocarbon such as trichloroethylene, tetrachloroethylene, dichloroethane, dichloroethylene or the like. Low density polyethylene, medium density polyethylene, high density polyethylene, atactic (amorphous) polypropylene, isotactic (crystalline) polypropylene, ethylene-propylene copolymer, propylene-butylene copolymer can be mentioned as useful polyolefins. It is preferable to use a solution having a gelation point of 40°–60° C at a concentration in the range of 1–5% by weight. However, among the above-mentioned, a combination of benzene (b.p. 80.1° C), cyclohexane (b.p. 80.7° C), dichloroethylene (b.p. 83.5° C) with a resin other than atactic polypropylene is not of practical value because of poor solubility. Though tetraline (b.p. 210.5° C) or kerosene (b.p. 150°–320° C) provides nice gel-forming property, they are the examples which are not useful on account of too high boiling point. For the foregoing reason, toluene, xylene and tetrachloroethylene are preferable as a solvent for polyolefins and inflammable tetrachloroethylene is most suitable if safety is also taken into consideration.

Copolymers of olefins with other monomer or monomers are also useful in the method of the present invention provided that they maintain the gel-forming property. For example, in case of copolymers of an olefin with vinyl acetate, those having a higher content of vinyl acetate group than 5 weight % become unusable because vinyl acetate group provides higher solubility and lowers gelation temperature. Ethylene copolymer containing 5% by weight of vinyl acetate has a gelation temperature almost equal to that of polyethylene and is useful in the method of the present invention, but ethylene copolymer containing 10% by weight of vinyl acetate has a gelation temperature of 20°–25° C, and hence the coating of individual particles becomes difficult due to the agglomeration under the same condition.

The most typical resin in the point of gel-forming property is polyvinylidene type resins. Those combined with solvents used in case of polyolefin type resins have a gelation temperature of 90°–100° C and these are most suitable kinds of resin for the method of the present invention and thus they can be used for coating under the condition same with that of the case of polyolefins. However, since the degree of freedom in dissolution control is inferior to that of the case of polyolefins, the practical value is less.

In case of polyvinyl chloride which is a general purpose resin there is no suitable solvent (i.e., solvents are either incapable of dissolving this resin or nothing but a common solvent). A certain kind of vinyl ether copolymer provided a gel-forming solution but it was observed that this solution contained partially-insoluble part and could not have been used as it was, although, when the hot solution was filtered and the insoluble part was removed, it became a suitable solution.

The concentration of the gel-forming resin solution used in the method of the present invention varies according to the polymerization degree and crystallinity of resin. Generally, if the polymerization degree is lower and if the crystallinity is smaller, there is an advantage in that higher concentration of solution can be used, but, when the same kind of resin is employed, better effectiveness of coating is attained if crystallinity of resin is higher and density of resin is higher. The solution is used at a concentration which provides a viscosity of 40 CP or less, preferably 20 CP or less at the time of dissolving but it is preferable to use simultaneously a compatible material such as a lower molecular weight resin, paraffin wax or the like. Further it is also possible to use simultaneously a resin having no gel-forming property with a proviso that the above-mentioned viscosity be maintained. Although the concentration of resin used varies according to various conditions such as those above-mentioned, a concentration of 10% by weight or less is generally used. It is preferable to use atactic polypropylene at a concentration of 10% or less, low density polyethylene at a concentration of 5% or less, high density polyethylene or isotactic polypropylene at a concentration of 1% or less.

The granular fertilizers used in the method of the present invention can have any component and granule size, but it is necessary to change the coating percentage according to granule size. Most preferable granule size is 3–5 mm in diameter. Granules smaller than this size are not preferable because coating percentage must be elevated and those larger than this size are also not preferable because non-uniformity of distribution is liable to be formed place to place when applied to forming fields. Coating treatment is in general easy in case of larger granule. As for granule shape, there is no need of being spherical but smooth surface is preferable.

It is necessary to select a coating percentage in the range of 3-4% low density polyethylene and 2-3% for high density polyethylene or isotactic polypropylene.

It is easy to judge by appearance the difference of the capsule of the present invention from the capsule formed by common drying procedure of the solution used in the method of the present invention. The capsule obtained according to the method of the present invention has transparency and lustre same as those of common films and also a strong tensile strength, but the above-mentioned capsule formed by common drying shows white turbidity, and cannot be peeled off as film piece from the fertilizer granules, and moreover it has no lustre. Since it is nothing but piled up resin powders containing some amount of solvent, it has no sufficient mechanical strength. If granules collide strongly with each other during coating step, once-adhered coating is detached.

In the method of the present invention, measurement of properties of capsules is difficult and hence is not made for the purpose of evaluation thereof. Dissolving-out percent is measured and substituted for the above-mentioned purpose. This is because of the fact that to whatever the coating percent of gelated capsule is increased, practical effectiveness as fertilizer having slow releasing property cannot be obtained and dissolving-out percent of capsule during the time of 24 hours is more than 90%, whereas the capsule obtained according to the method of the present invention shows only several % of dissolving-out percent.

As a prior art similar to the method of the present invention, there is a method (of Japanese Patent Publication No. 25686/1971) which relies on a solution of atactic (amorphous) polypropylene. Rather exceptional result of this prior art is due to the property of amorphous polypropylene which has less tendency of phase separation than any other polyolefin and hence production was feasible even with a revolving drum, etc. However, even in case of amorphous polypropylene, better effectiveness of treatment can be obtained according to the method of the present invention.

The valuableness of the present invention is in the capability of controlling the dissolving rate of product. In the conventional methods such as a multiple coating method which uses a thermosetting resin or sulfur coating method, the release of fertilizer component has been controlled by providing pinholes in the coating of granules formed during preparation or by decomposition of sulfur by soil microorganisms. However, in the method of the present invention, the control of dissolving is carried out by providing practically insoluble granular fertilizers completely coated with very thin film in the first step and by adding a certain additive e.g. a hydrophilic substance in the coating films to give an arbitrary dissolving speed in the second place.

Even when water-soluble fertilizers are completely coated for the first step object, it is not possible to stop the dissolution completely, because any films themselves have permeability to moisture and when fertilizers are exposed to water or the atmosphere of high steam pressure for a long time, water enters the inside of the capsule through the films, causes the deliquesence of the inside salts and elevates the osmotic pressure. However in case of a polyolefin having an extremely small moisture-permeability excepting amorphous polyolefin, dissolution is extremely small and practically neglibile if time is about one year. In case of polyvinylidene chloride having further smaller moisture-permeability, dissolution can be completely negligible. At any rate the first step object can be substantially attained.

The second step object is attained by various processes but the most effective process is the addition of a certain kind of surfactant. Among surfactants, those having high hydrophilic property are not effective. Non-ionic surfactants having high oleophilic property, particularly polyoxyethylene alkylphenylether series surfactants having about HLB of 12, are preferable. The amount of sarfactants added is preferably in the range of 0.1-15% by weight based upon the weight of main resins. By changing the amount of addition of such surfactant, or kind of resin, it is possible to control optionally the lapse of time from application to soil to start of dissolution and dissolving speed after start of dissolution.

If the main thermoplastic resin of the present invention is used in admixture with another thermoplastic resin having a higher moisture-permeability than that of the main resins, the resultant product shows, in general, a mean moisture-permeability of the two, whereby the dissolving speed of fertilizers is elevated. Said another thermoplastic resin is that soluble in solvents to be employed in the present invention and the amount thereof added is preferably 30% by weight or less. By utilizing said another thermoplastic resin having a higher moisture-permeability, dissolving speed of fertilizer components can be controlled as in the case of said surfactants. Further, said another thermoplastic resin is also useful as a extender of the main resins. Further, as materials to be added to polyolefins, waxes such as paraffin wax, hardened oil, etc. which are easily available in commerce can be mentioned. It is practical to add waxes in an amount of 30% by weight or less. When fertilizers are encapsulated with a resin containing a substances easily decomposable by soil microorganism such as paraffin wax or the like, the easily decomposable substance is decomposed and increases the dissolving speed.

This gelation point becomes higher with the increase of the concentration slowly in the range of lower concentration while rapidly in the range of higher concentration, but it does not vary almost at all at a concentration of 5% or less. Accordingly, measurement at a concentration of 1-5% is desirable. Examples of the judgement test are shown in Table 1.

EXAMPLE 1

(Judgement of gel-forming resin solution)

A testing method which is used to examine whether a solution is a gel-forming resin solution of the method of the present invention or not, will be hereinafter described.

A resin a solvent are fed into a 300 ml three-necked-flask equipped with a stirrer, a cooler and a thermometer and the temperature of the contents are elevated close to the boiling point thereof with stirring to carry out dissolution. If no dissolution occurs, the combination of resin and solvent cannot be employed, but if there is an insoluble part, concentration is lowered and again subjected to dissolution test. After confirmation of complete dissolution, the heat source used for heating is removed and slowly cooled with stirring. If the contents thus tested are a solution which can be used in the present invention, the whole of the solution becomes white-turbid, gelates and loses its fluidity due to the precipitation of the resin contained therein. If the temperature at which white-turbidity begins, i.e., if the gelatin point is within the range of 40° C–100° C, and the boiling point is within the range of 110–140° C, this solution will be a preferable resin solution for the method of the present invention.

40°–50° C, 50°–60° C, 60°–70° C, 70°–80° C and 80°–90° C, respectively. In the procedure of preparation, 6.6 kg of the solution (containing 0.33 kg of polyethylene) was dried with hot air while the solution was added when the temperature reached the upper limit of the given range of temperatures, but the addition was stopped when the temperature fell to the lower limit thereof. Such drying and temperature elevation were repeated to complete the addition of the given amount of the solution. The granules thus treated got an increase of 0.3 kg.

During this treatment procedure, no agglomeration of granules due to mutual adhesion occurred and the Table I

| Judgement Test for Gel-Forming Resin Solution (in the range of 115° – 20° C) | | | | | |
|---|---|---|---|---|---|
| Resin Tested | Solvent | Concent-ration | Dissolving condition | Gelation Temperature | Judgement |
| Low density PE[1] (MI: 20) | Tetrachloroethylene | 5 wt. % | 115° C, stirring | 54° C | Preferable for the present invention |
|  | Xylene | " | " | 53 | " |
| High density PE (MI: 13) | Tetrachloroethylene | 2 wt. % | " | 58 | " |
|  | Xylene | " | " | 57 | " |
| Amorphous pp[2] | Tetrachloroethylene | 10 wt. % | " | 47 | " |
|  | Xylene | " | " | 46 | " |
| Polyvinyliden chloride film (Saran-Wrap)[3] | Tetrachloroethylene | 4 wt. % | " | 91 | " |
|  | Xylene | " | " | 94 | " |
| Polystyrene (MI: 40) | Tetrachloroethylene | 5 wt. % | " | No phase separation | Not useful for the present invention |
|  | Xylene | " | " | " | " |
| Ethylene-VAC[4] copolymer (VAC: 5 wt.%) | Tetrachloroethylene | " | " | 43 | Useful for the present invention |
| Ethylene-VAC copolymer (VAC: 10 wt. %) | Tetrachloroethylene | " | " | 20–25 | Not preferable for the present invention |

(Notes)
[1]PE: Polyethylene
[2]Amorphous polypropylene having a molecular weight of 65,000 and containing 3.5% by weight of ethylene (manufactured by Chisso Petrochemical Co., Japan)
[3]Trade mark of polyvinylidene chloride film manufactured by Asahi Dow Co., Ltd., Japan
[4]VAC: Vinyl acetate

EXAMPLE 2
(Referential Example)

(Coating treatment with polyethylene solution) according to conventional drying method)

3.0 kg of granules of Sun Nitro No.1 (potassium ammonium nitrate phosphate complex fertilizer, $N:P_2O_5:K_2O = 15:15:12$, size 3.0–4.0 mm, product manufactured by Asahi Kasei Kogyo Kabushiki Kaisha, Japan) was introduced into a rotary pan having a diameter of 30 cm (sugar-coating machine), and then 5% (by weight) solution of polyethylene M6545 (MI 45) (trade mark of product manufactured by Asahi Dow Co., Ltd., Japan) in tetrachloroethylene, maintained at 100° C was added to the granules in the form of atomized spray by means of a two-fluids-nozzle (a commercially available spray gun for coating), while the pan was rotated at 10 rpm and the temperature of the granules was maintained at given temperatures with a 3 M³/min. hot air for heating, at 100° C. The coating treatment was carried out under 5 kinds of temperature condition, i.e., the temperature was maintained at resulting granules were each separately capsulated, but the resulting capsules were non-lustrous, white turbid and fragile and failed to have a film state. The granules thus obtained were impregnated with water in an amount of 20 times the weight of the granules and maintained at 25° C for 24 hours to observe the nitrogen-dissolving-out percent. The result was 98%. Thus, no practical effectiveness of the capsulation was obtained.

The same encapsulation treatment as above was carried out with trichloroethylene, xylene and toluene to give similar results. As for the temperature of the granules, no encapsulation of individual granule was effected above 100° C due to adhesion of resin. When the number of revolution was elevated to 30 rpm, the momentum of granules became greater and once adhered capsule was mechanically stripped off, and no encapsulation was effected. Similar results were obtained with other polyethylene such as M-6520, M-7620 and M-2270 (trademarks of products manufactured by Asahi Dow Co., Ltd., Japan), low molecular weight polyethylene such as Sun Wax 161-P (trademark of product manufactured by Sanyo Kasei Co., Ltd., Japan, average molecular weight: 5,000) and low molecular weight polypropylene such as Viscol 550-P (trademark of product manufactured by Sanyo Kasei Co., Ltd., average molecular weight: 4,000). According to the encapsulation treatment using a polyolefin solution in this Example, it was evidenced that no agglomeration of granules occurred and encapsulation of individual granule could be easily carried out, but the capsule obtained according to this procedure caused a phase separation and did not form a film. Thus no practical effectiveness of encapsulation was obtained.

EXAMPLE 3

(Referential Example)

(Coating treatment by means of a rolling fluidized bed)

In Examples 2, no agglomeration of granules occurred but a phase separation occurred at the time of gelation and thus substantially no encapsulation effectiveness was obtained, as mentioned above.

Since the drying condition of granules was unclear when a rotary pan or a revolving drum was employed, coating treatment was carried out using a rolling fluidized bed which was an apparatus containing a rotating multi-perforated plate and having such a specific feature that the drying condition could be expressed more clearly. The rolling fluidized bed employed in this test is shown in FIG. 1 where the multi-perforated plate and the inner wall of the column were lined with teflon film. In this figure, what are indicated by the numerals and symbols are as follows:

1. Apparatus of rolling fluidized bed
2. Rotating multi-perforated plate
3. Shaft for rotating said multiperforated plate
4. Nozzle
5. Exit pipe (50 m/m $\phi$)
6. Exit of discharged gas
$T_1$ Thermometer for drying gas
$T_2$ Thermometer for granules
$T_3$ Thermometer for discharged gas
7. Gas heater
8. Orifice part
9. Gas-controlling valve
10. Blower
11. Flowmeter
12. Pump for solution
13. Tank of solution 4.0 kg of the granular fertilizer employed in Example 1 was introduced into the fluidized bed apparatus having a diameter of 25 cm and an inclination of 50° at the conical part.

Coating treatment was carried out by rolling the granules under a plate-revolving of 200 rpm and drying them with hot air sent through the multiperforated plate while adding a polyolefin solution thereto in a spray form through the nozzle part (a commercially available spray gun). The pipe for feeding the solution was insulated, and care was taken so that the temperature did not lower by 10° C or more above the boiling point of the solvent at the nozzle part. Five % by weight solution of polyethylene (No. M 6545, trademark of product manufactured by Asahi Dow Co., Ltd., MI: 45) in tetrachloroethylene was added to the above-mentioned rolled and fluidized granules in a spray form, at a rate of 150 g/min, and under combinations of three kinds of space column velocities of hot air passed through the multi-perforated plate, in the fluidized bed, i.e., 0.5, 1.0 and 2.0 m/sec with 5 kinds of granule temperatures, i.e., 50°, 60°, 70°, 80° and 90° C. The temperature of hot air for drying in this case ($T_1$ in FIG. 1) was set to a temperature 3°–4° C higher than the granule temperature, although it is varied depending upon the amount of the hot air and the granule temperature. The solution was fed for 55 minutes and thereafter the granules were allowed to stand for 10 minutes and then taken out to give a coated granular fertilizer having a coating percent of 10% by weight.

The coated granular fertilizer obtained according to this treatment did not form a jellylike gel due to phase separation as in the case of Example 2, and some protruded parts of the capsules were peeled off by the rolling motion. Thus, under the drying condition of a space column velocity of 2 m/sec, no uniform film of capsules could be obtained. The nitrogen-dissolving out percent was observed under the same condition as in Example 2. A result after 24 hours was in the range of 90–98%. Thus, no practical effectiveness of encapsulation could be obtained.

Further, even when various polyolefins (excluding amorphous polypropylene) and various solvents were used as in Example 2, similar results were obtained. Thus, at a space column velocity lower than 2 m/sec, no slow-releasing coated granular fertilizer could be obtained. However, no agglomeration of granules due to mutual adhesion thereof was observed as in Example 2.

EXAMPLE 4

(Coating treatment of amorphous polypropylene by means of rolling fluidized bed)

A solution obtained by dissolving an amorphous polypropylene by-produced at the time of production of polypropylene resin and having an average molecular weight of 65,000 and containing 3.5% by weight of ethylene (product manufactured by Chisso Petrochemical Co., Japan), in tetrachloroethylene in 10 times theamount by weight thereof, was fed to granules of Sun Nitro No. 1 rolled and fluidized under the same conditions as in Example 3, at a rate of 130 g/min. for 34 minutes to give a product having a coating percent of 10%, which was then subjected to measurement of nitrogen-dissolving out percent for 24 hours in the same manner as in Example 2. The results are shown in Table 2.

Table 2

| Space velocity | Granule temperature | Dissolving out percent for 24 hours | Appearance of films |
|---|---|---|---|
| 0.5 m/sec | 50° C | 96% | Protruded parts of capsules were peeled off in all cases. |
|  | 60 | 90 |  |
|  | 70 | 88 | There was no luster. |
|  | 80 | 91 | Gel form. |
| 1.0 m/sec | 50° C | 84% | Improved to some extent as compared with the case of 0.5 m/sec. |
|  | 60 | 62 |  |
|  | 70 | 59 |  |
|  | 80 | 77 |  |
| 2.0 m/sec | 50° C | 30% | No peeling off of capsule at the protruded parts of the granules. Luster observed to some extent. |
|  | 60 | 21 |  |
|  | 70 | 16 |  |
|  | 80 | 20 |  |

It was presumed from Table 2 that, in the case of amorphous polypropylene, film-coating property was superior to that in the case of polyethylene; encapsulation effectiveness was obtained under the drying condition of a space column velocity of 2 m/sec (granule temperature: 50°–80° C); and the limiting point was in the vicinity thereof.

EXAMPLE 5

(Coating treatment by means of fluidized bed)

In order to further increase the velocity of air, the rotating multi-perforated plate part in FIG. 1 was replaced by a common multi-perforated plate (hole diameter: 3 mm, hole pitch: 5 mm, holes were arranged to form a right triangle) to form a usual fluidized bed. Fertilizer granules (the same as those employed in Example 2: 4 kg fed) were fluidized with hot air stream for drying, setting the space column velocity of air in the fluidized bed to 5 m/sec. A one-fluid-nozzle (nozzle opening: 0.6 mm) capable of forming a spraying angle of 60° to the surface of the upper part of the fluidized bed was fixed at such a position that polyolefin solution could be sprayed over the whole surface of the fluidized bed. Thus, polyolefin solution in a dissolved state was added at a rate of 300 g/min to carry out coating treatment. When the temperature of hot air below the multiperforated plate, was set to a temperature about 10° C higher than the granule temperature, said temperature of hot air came close to the set temperature of granules, and also the temperature of discharged gas (thermometer of discharged gas: $T_3$ in FIG. 1) became almost equal to the granule temperature.

As for the polyolefin solution, a 5% by weight solution of polyethylene (No. 6545, product of Asahi Dow) in tetrachloroethylene used in Example 2 was fed for 34 minutes and then dried for 10 minutes to give a product having a coating percent of 10%.

Table 3

| Granule temperature | Dissolving out percent for 24 hours | Appearance |
|---|---|---|
| 50° C | 30.5% | No peeling off at the protruded parts; surface luster could be seen; but strength was not fully satisfactory; and it was presumed that the velocity was in the vicinity of low limiting velocity of stream. |
| 60° C | 14.3% | |
| 70° C | 17.3% | |
| 80° C | 19.4% | |

When other kinds of polyethylene (M-6520 and M-7620, both, products of Asahi Dow) were tested, similar results were obtained. According to this method, sprayed liquid drop was hardly attached onto the granular fertilizer, and polyolefin powder from which solvent vaporized off was existent in discharged gas in admixture therewith in a considerable amount, and also the amount of the powder attached onto the apparatus was large, whereby the coating efficiency was reduced. Since such an apparatus was not desirable as mentioned above, further studies were made using an apparatus wherein the central part of the multi-perforated plate was opened to change the fluidized bed to a forced circulation type fluidized bed and a nozzle was provided at the central part of the resulting opening.

EXAMPLE 6

(Coating treatment by means of forced circulation type fluidized bed)

The multi-perforated plate used in Example 5 (hole diameter: 3 mm, hole pitch: 4.5 m/m, hole arrangement: right triangle, opening ratio: 0.1448) was replaced by a multi-perforated plate having an opening of 40 m/m in diameter at the central part, (hole diameter: 3 m/m, hole pitch: 4 m/m), which was equipped with a one-fluid-nozzle (diameter of opening: 0.6 mm, spraying angle: 45°) at the central opening part. The amount of air was set so as to give an average space column velocity of 5.0 m/sec, and under the same conditions as in Example 5, polyethylene solution was fed for 27 minutes to carry out coating treatment. The results are shown in Table 4.

(10% coating treatment by means of 5% solution of No. M 6545 (product of Asahi Dow) in tetrachloroethylene)

Table 4

| Granule temperature | Dissolving out percent for 24 hours | Appearance |
|---|---|---|
| 50° C | 13.5% | No peeling off at the protruded parts; lustrous; transparent |
| 60° C | 10.4% | " |
| 70° C | 11.3% | " |
| 80° C | 12.5% | " |

The flow rate of air ejecting from the central opening part of the multi-perforated plate into the fluidized bed in this Example 6 could not be measured, but should have certainly been higher than the average space column velocity although this may be not accurate. The reason of the higher treatment effect obtained in the test run of this apparatus, as compared with that in the case of usual fluidized bed, consists mainly in the higher speed of the abovementioned stream of hot air for drying.

Thus, it was clarified by this Example that, in the coating treatment with polyolefin solution, even when hot air was used for drying in the same amount as in Example 5, a preferable result could be obtained when the hot air was concentrated onto the part where the solution was added. Further by providing the nozzle at the lower part, the adhesion efficiency was observed to be increased.

EXAMPLE 7

(Coating treatment by means of spouted bed having a spout guide column)

Figure 2:
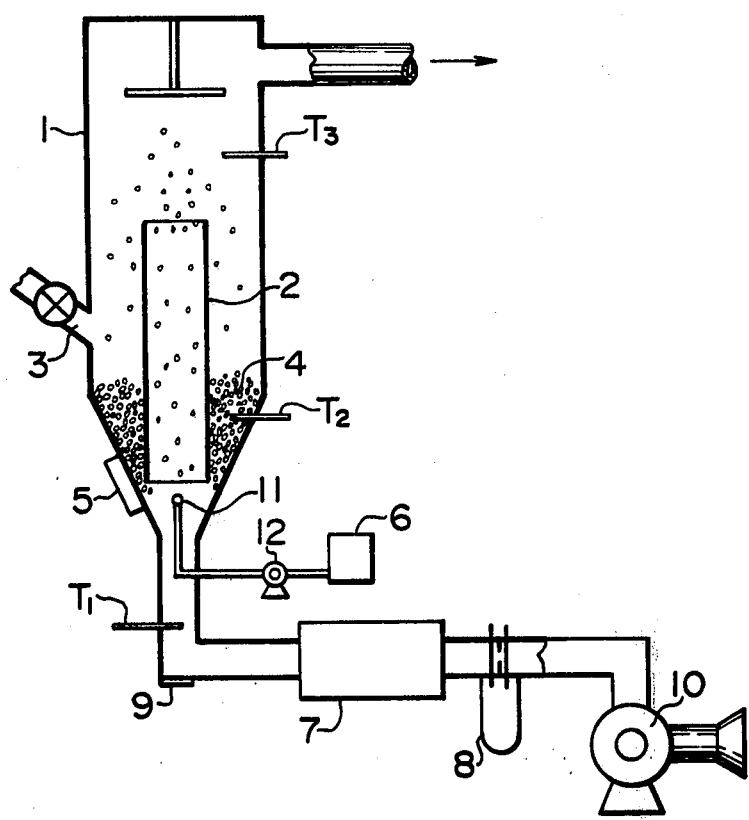

In the fluidized bed, if the flow rate is further increased, blowing away of granules becomes violent and no more fluidized bed is formed above the terminal velocity. Accordingly, if it becomes necessary to further increase the flow rate under the same granule size, it is necessary to use a moving bed. Thus, also in the course of the development of the present invention, coating treatment was carried out using a spouted bed having a spout guide column. Namely, the body of the fludized bed shown in FIG. 1 was reconstructed so as to provide an apparatus similar to the coating apparatus shown in Japanese patent publication No. 2294/1963 (see FIG. 2). In FIG. 2, what are indicated by numerals are as follows:

1. Coating apparatus using spouted bed having a spout guide column

2. Spout guide steel pipe (teflon-coated, diameter: 100 mm)
3. Hopper inlet of fertilizer granules
4. Fixed layer of dropped granules
5. Vibrator
6. Solution tank
7. Gas heater
8. Orifice part
9. Discharge exit
10. Blower
11. Nozzle 12. Pump
$T_1$ Thermometer for drying gas
$T_2$ Thermometer for granules
$T_3$ Thermometer for discharging gas The conical part of the body has an inclination of 50°. In order to make the movement of granules of fixed bed easy, a vibrator is provided. More particularly, the multi-perforated plate used above was removed, and instead, a teflon-coated steel pipe having a diameter of 10 cm and a length of 1 m was provided at the central part of the apparatus for the fluidized bed, in parallel to the body of the apparatus (i.e., vertically), so that the lower end of the pipe might be 5 cm apart from the wall of the conical part of the apparatus, and further a one-fluid-nozzle (spray angle: 30°) 11 was provided vertically to the apex of the conical part (i.e., directed toward the center of the pipe at the central part). 4.0 kg of the fertilizer granules used in Example 2 was fed while hot air stream for drying was passed through within the cylinder. The fertilizer granules were carried and moved upwards within the cylinder provided inside the apparatus, by hot air stream, and during the course of this operation, they were coated. When they came out of the cylinder, the velocity was reduced below the terminal velocity, and they dropped onto the body side of the apparatus. The dropped granules formed a fixed layer, and gradually moved downwards to form a moving layer again and move upwards. In this Example, the amount of hot air was controlled so that the flow rate within the cylinder might be 15 m/sec (7.5 m³/min) or 30 m/sec (15 m³/min) and also the temperature of the granules in the solid phase was controlled to a given temperature, while the following solution was fed through a one-fluid-nozzle (opening: 0.6 mm), at a rate of 150 g/min for 55 minutes in the case of 15 m/sec, and at a rate of 300 g/min for 27 minutes in the case of 30 m/sec to give a fertilizer coated by 10% by weight of polyethylene. The temperature of the drying gas is to be set to a temperature about 10° C higher than the granule temperature, but since it varies depending upon room temperature, humidity, etc., it was confirmed at each case.

In this Example, experiment was carried out by dissolving polyethylene (No. M 6545, product of Asahi Dow) in tetrachloroethylene so as to give a 5% by weight solution, and by maintaining the temperature of the resulting solution so as to make it reach the nozzle in the same dissolved state as in other Examples. The nitrogen-dissolving out percent of the resulting products (in water at 25° C) are shown in Table 5.

Table 5

| Velocity of air | Granule temperature | After 24 hours | After one month | Appearance |
|---|---|---|---|---|
| | 50° C | 1.0% | 3.8% | Lustrous, transparent and uniform capsule, |
| | 60° C | 1.2% | 4.7% | capsule peeled |

Table 5-continued

| Velocity of air | Granule temperature | After 24 hours | After one month | Appearance |
|---|---|---|---|---|
| 15 m/sec | 70° C | 1.8% | 4.9% | off from granular fertilizer exhibits a tough film state |
| | 80° C | 2.4% | 10.3% | |
| | 50° C | 0.3% | 0.9% | |
| | 60° C | 0.3% | 1.1% | |
| 30 m/sec | 70° C | 0.4% | 2.9% | " |
| | 80° C | 1.9% | 4.9% | |

In this Example, it was clarified that complete capsule could be obtained by further increasing of the flow rate of hot air for drying.

EXAMPLE 8

(Coating treatment by means of spout bed)

Figure 3:
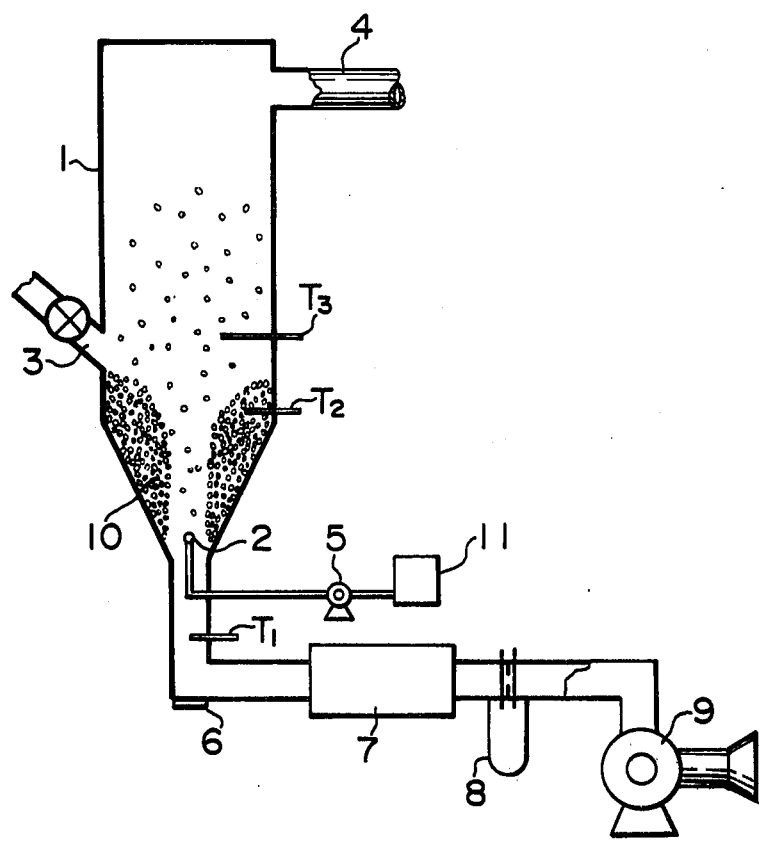

In the above Example 7, a cylindrical pipe was provided inside the body of the apparatus for fluidized bed to observe the relationship between the flow rate and the encapsulation effectiveness, but since it was practically unnecessary to employ such a pipe, this was removed and the following experiment was carried out: A one-fluid-nozzle (opening: 0.8 mm) was provided vertically to the apex of the conical part of the body of the apparatus for fluidized bed, similar to the coating apparatus shown in U.S. Pat. No. 311,220 (see FIG. 3). In FIG. 3, what are indicated by the numerals are as follows:
1. Coating apparatus by means of spouted bed
2. Spray nozzle (opening: 0.8 mm)
3. Hopper inlet of fertilizer
4. Exit for discharge gas
5. Solution pump (500 g/min)
6. Discharge exit
7. Gas heater (4 m₃/min)
8. Orifice part
9. Blower
10. Granular fertilizer (5 kg)
11. Solution tank The temperature conditions in this experimental example are as follows:

| | | | |
|---|---|---|---|
| $T_1$ | 80° C | 90° C | 100° C |
| $T_2$ | 50 | 60 | 70 |
| $T_3$ | 48 | 57 | 65 |

Hot air stream for drying was ejected at a rate of 4 m³/min. 5.0 kg of granular fertilizer used in Example 2 was fed and a spout was formed, while polyethylene solution (obtained by dissolving M 6545 of Asahi Dow's product in tetrachloroethylene in 20 times the amount of weight of the polyethylene) was sprayed from the nozzle, to carry out coating treatment. As for the flow rate of the gas column in this case, the value of measurement, although not accurate, was about 15–20 m/sec (by means of Pitot tube). Under such conditions, the solution was added at a rate of 500 g/min. The temperature of hot air for drying was set to a temperature 30° C higher than the granule temperature, and operation was started. During the operation, a certain extent of temperature correction was made to maintain the set temperature. The solution was fed for 20 minutes to give a coated granular fertilizer having a coating percent of 10%. The nitrogen-dissolving out percents after 24 hours are shown in Table 6. There was no great influence of granule temperature.

Table 6

| Granule temperature | Dissolving-out percent | Appearance |
| --- | --- | --- |
| 50° C | 0.3 | Same as in Example 7 |
| 60 | 0.4 | Same as in Example 7 |
| 70 | 0.5 | Same as in Example 7 |

According to this Example, it was clarified that a higher treatment effect could be obtained in a higher velocity stream of hot air.

EXAMPLE 9

(Effect of kinds of polyethylene upon coating treatment)

Using the same apparatus as in Example 8, 5 kg of the granular fertilizer used in Example 2 was subjected to spouted bed of hot air at a flow rate of 4 m³/min. After the granule temperature reached 60° C, various polyethylene solutions shown in Table 7 were fed for 10 minutes at a rate of 500 g/min to give products having coating percents shown in Table 7. Under such conditions, a certain extent of adjustment was necessary for maintaining the temperature of the spouting air for drying to about 90° C and also for maintaining the granule temperature during the coating treatment to 60° C. The resulting products had no block and the treatment was well operated. The dissolving out percents in water after 24 hours, of the resulting coated granular fertilizer were measured. The results are shown in Table 7. As seen from these results, no difference due to M.I. was observed, but when the coating percent was lowered as in this Example, influence of resin density appeared, namely, a higher effectiveness of treatment was obtained with a higher resin density.

Table 7

| Kind of resin | | | Concentration of solution | Coating percent (treating time) | Nitrogen-dissolving out percent after 24 hours | Treating property |
| --- | --- | --- | --- | --- | --- | --- |
| Grade | M.I. | Density (g/cc) | | | | |
| M 6545 | 45 | 0.915 | 3 wt. % | 3% (10 min) | 2.8 | good |
| M 6520 | 20 | 0.915 | 3 wt. % | 3% (10 min) | 2.9 | good |
| M 7620 | 20 | 0.925 | 3 wt. % | 3% (10 min) | 0.3 | good |
| M 1680 | 8.0 | 0.916 | 3 wt. % | 3% (10 min) | 3.0 | good |
| M 2270 | 7.0 | 0.922 | 3 wt. % | 3% (10 min) | 0.6 | good |
| M 1820 | 2.0 | 0.916 | 3 wt. % | 3% (10 min) | 3.3 | good |
| J 320 | 13 | 0.965 | 2 wt. % | 2% (10 min) | 0.9 | good |
| J 340 | 7 | 0.955 | 2 wt. % | 2% (10 min) | 1.4 | good |
| Polyethylene wax | | | 10 wt. % | 10% (10 min) | 10.5 | good |

Resin:
M-column — low density polyethylene manufactured by Asahi Dow
J-column — high density polyethylene manufactured by Asahi Kasei Kogyo K.K. Japan
Polyethylene wax — San wax 161-P (molecular weight: 5,000), (trademark of product manufactured by Sanyo Kasei Co., Japan)
Solvent: Tetrachloroethylene

EXAMPLE 10

(Simultaneous use of waxes)

Under the same conditions of spouted bed as in Examples 9, the effect of addition of waxes was observed. The granular fertilizer, amount of air, feeding rate of solution and temperature condition are same as those in Example 9. The conditions and the results are shown in Table 8.

Table 8

| Kind of additive and rate of addition | | Solution concentration | Coating percent (treating time) | Nitrogen-dissolving out percent after 24 hours | Treating property |
| --- | --- | --- | --- | --- | --- |
| Paraffin wax | 10% | 5 wt. % | 3% (6 min) | 1.3% | good |
| (m.p. 60–62° C) | 20% | 5 wt. % | 3% (6 min) | 0.9% | good |
| | 30% | 5 wt. % | 3% (6 min) | 0.7% | good |
| Polyethylene wax | 30% | 5 wt. % | 3% (6 min) | 0.9% | good |
| Hardened oil | 30% | 5 wt % | 3% (6 min) | 0.4% | good |
| (m.p. 50–52° C) | | | | | |
| Amorphous polypropylene | 30% | 5 wt. % | 3% (6 min) | 0.9% | good |
| Resine, alone | | 5 wt. % | 3% (6 min) | 1.3% | good |

(Notes)
Resin employed: Polyethylene wax: Amorphous polypropylene:
M-7620 manufactured by Asahi Dow Same as that used in Example 9 Average molecular weight, 20,000; ethylene content, 3.5%; product manufactured by Chisso Petrochemical Co.
Solvent: tetrachloroethylene The treating property and treating effect were improved by adding a waxy substance.

EXAMPLE 11

(Treating temperature and treatment effectiveness)

For obtaining capsule which does not cause any phase separation in the polyolefin solution, the flow rate of hot air and the granule temperature are important factors.

In this Example, the influence of treating temperature is illustrated by examples.

Under the same conditions as in Example 9, coating treatment was carried out using the same granular fertilizer as in Example 2 and 5% by weight solution of polyethylene (No. 6545 of Asahi Dow, M.I. 45) in tetrachloroethylene, while the granule temperature was maintained at the values given in Table 9, to give coated products. The nitrogen-dissolving out percents after 24 hours and the appearances of the products are measured as shown in Table 9.

Table 9

| Granule temperature | Nitrogen-dissolving out percent after 24 hours | Appearance |
|---|---|---|
| 50° C | 1.4% | Transparent and uniform capsule |
| 40° C | 2.1% | " |
| 30° C | 30 % | Opaque, white-turbid |
| 25° C | 75 % | " |

As shown in this Example, it was clarified that superior capsule could be obtained at a granule temperature of 40° C or higher. As already confirmed, further rising of flow rate to 30 m/sec results in product of the same quality even at 40 ° C. Below 30° C, a gel-like capsule could not be obtained due to phase separation, although this may not be decided univocally.

However, it is undesirable to make the granule temperature too high, since block occurs due to adhesion. Although this varies depending upon kind of resin, temperature condition of a temperature about 100° C should not be selected.

EXAMPLE 12

(Coating treatment by the use of polypropylene)

Although crystalline polypropylene is difficult to handle due to its high resistance to solvent, even this resin can be employed without any problem, if it has a lower molecular weight. This Example shows that even polypropylene can be encapsulated, although there are cases where restriction is necessary by concentration of solution.

5.0 kg of the fertilizer granules used in Example 2 was fed to the apparatus used in Example 8, and spout at a flow rate of 5 m³/min was formed, as in Example 9. When the granule temperature reached 60° C, resin solution was fed at a rate of 500 g/min to give a product having a coating percent of 4%. Tetrachloroethylene was used as a solvent. The resin employed, concentration, coating percent, solution-feeding time and coating effect are shown in Table 10. Other operation conditions are same as those of other Examples using spouted bed.

Table 10

| Kind of resin | Concentration | Coating percent (solution-feeding time) | Nitrogen dissolving out percent in water for 24 hours | Treating property |
|---|---|---|---|---|
| Polypropylene resin (Noblen MA-3) * | 2% | 4% (20 min) | 0.1% | Blocks of 2-3 granules were formed in admixture in a small amount |
| Low molecular weight polypropylene (Viscol 550-P made by Sanyo Kasei) | 10% | 4% ( 4 min) | 10.4% | No Block |
| Mixture of polypropylene resin (30%) with low molecular weight polypropylene resin (70%) | 5% | 4% ( 8 min) | 2.1% | No Block |

* Trademark of product manufactured by Mitsubishi Kasei K.K., Mitsui Kagaku K.K. and Sumitomo Kagaku K.K., Japan)

As shown in this Example, even polypropylene can be treated as in the case of polyethylene. Further, when polypropylene having a higher molecular weight is used and blocks of 2-3 granules are formed in admixture, the problem of block forming can be overcome by adding other kinds of waxes such as low molecular weight wax, hardened oil, etc. Further, if necessary, polypropylene is blended with polyethylene in an optional ratio and used for coating treatment.

EXAMPLE 13

(Solvent and coating treatment)

As for the solvent to be used for the present invention, petroleum oil solvents such as benzene, toluene, xylene, etc., and chlorinated hydrocarbons such as tetrachloroethylene, trichloroethylene, etc. can be mentioned, and also, solvents which are similar in the physical properties of solution and boiling point to those of the above-mentioned can be employed. This Example will clarifies the usefulness of the above-mentioned five kinds of solvents in the coating treatment.

Coating of granular fertilizer was carried out using polyethylene M 7620 (M.I. 20) (manufactured by Asahi Dow), under the same conditions as in Example 9. Namely, the resin was dissolved in the solvents shown in Table 10 to prepare 3% by weight solution, which was then fed for 10 minutes at a rate of 500 g/min to give a coated granular fertilizer having a coating percent of 3%. During this preparation, the temperature of hot air was adjusted so as to maintain the granule temperature to 60° C. The nitrogen-dissolving out percent in water, of the resulting coated fertilizers in this Example are shown in Table 11. As evident from this Table, any of the solvents employed give a highly water-resistant, coated granular fertilizer.

Table 11

| Kind of solvent | Nitrogen-dissolving out percent After 24 hours | Treating property physical property |
|---|---|---|
| Benzene | 1.4% | No difference between any of these solvents. Superior treating property. |
| Toluene | 0.9% | |
| Xylene | 1.2% | |
| Trichloroethylene | 0.8% | |
| Tetrachloroethylene | 0.4% | |

EXAMPLE 14

(Treating temperature and phase separation in the use of amorphous polypropylene)

Amorphous polypropylene used in Example 5 was substituted for polyethylene used in Example 9 to give a coated product. The results are shown in Table 12.

Table 12

| Granule temperature | Nitrogen-dissolving out percent after 24 hours | Appearance of films |
|---|---|---|
| 50° C | 2.8% | Transparent; uniform; strong luster |
| 40° C | 2.0% | Transparent; uniform; strong luster |
| 30° C | 25% | Transparent; uniform; weak luster |
| 25° C | 30% | Opaque; white-turbid; no luster |

In the case of amorphous polypropylene, phase separation hardly occurs even when a somewhat lower temperature is employed than in the case of polyethylene, but, if temperature is too low, phase separation is observed as in the case of polyethylene.

EXAMPLE 15

(Treatment effect of amorphous polypropylene according to the present invention)

In advance a conventional method described in Japanese patent publication No. 25686/1971 was carried out.

3.0 kg of the granular fertilizer used in Example 2 was fed in a rotating coating machine. Ten % by weight solution of amorphous polypropylene in xylene, described in the Example, was added to the granular fertilizer under rolling, by means of a spray gun, intermittently over one hour, and during this period, it was dried with hot air and the surface temperature of the granules was maintained at 70°–80° C. During this period, 120 g of amorphous polypropylene and 1.08 kg of xylene was added to give 3.120 kg. of coated fertilizer.

Next, the method of the present invention was carried out.

Using the apparatus described in Example 8, 5 kg of the above-mentioned granular fertilizer was subjected to spout of hot air at a flow rate of 4 m³/min, while the above-mentioned solution of amorphous polypropylene in xylene was fed for 4 minutes at a rate of 500 g/min to give 5.2 kg of coated granular fertilizer. During this time, the granule temperature was maintained at 70° C, and the temperature of hot air was in the vicinity of 115° C. The nitrogen-dissolving out percents in water of the resulting coated granular fertilizer were measured. The results are shown in Table 13.

Comparison of nitrogen-dissolving out percent in water (at 25° C)

Table 13

| Treating method | one day | 5 days | 10 days | 20 days | 30 days | 60 days | 90 days |
|---|---|---|---|---|---|---|---|
| Conventional method | 12.6% | 17.8% | 27.9% | 38.5% | 44.3% | 60.4% | 71.0% |
| Present invention | 2.4 | 3.9 | 5.0 | 10.1 | 19.1 | 22.3 | 24.4 |

The conventional method is inferior in treatment effect since undesirable gel was brought about by a certain extent of phase separation, as compared with the film according to the method of the present invention, which is transparent and homogeneous without any phase separation.

EXAMPLE 16

(Experimental run in pilot plant scale)

In a spouted bed column having a shape similar to the apparatus indicated in FIG. 3, a column diameter of 500 mm, a conical angle of 50°, a spout orifice of 100 mm, air of 15 m³/min heated at 120° C was passed as spout and 50 kg of granular fertilizer used in Example 2 was charged. A 3% by weight solution of polyethylene resin (supplier Asahi Dow Co. brand: M-7620) in tetrachloroethylene was passed through a one-fluid-nozzle (opening diameter of 2 mm) provided at the conical part of the spouted bed apparatus at a rate of 3.5 kg/min for 15 minutes while it was maintained at 100° C. After completion of charging, the hot air was switched over to cold air and cooling was continued for 5 minutes under this condition, resulting in 51.5 kg of coated granular fertilizer. The temperature of granules at the time of feeding of the solution, and that of exhaust were maintained at 60° C. The nitrogen-dissolving out percentage of the coated granular fertilizer for 24 hours was 0.5%. Thus it is evident that even when the scale of apparatus is enlarged, those having a high effectiveness of treatment are obtained.

EXAMPLE 17

(Size of granule and coating percent)

Coated granular fertilizer was prepared by varying the size of granule used in Example 2 and varying the solution-feeding time under the same conditions as in Example 16, to observe the effectiveness of coating treatment. The results are shown in Table 14. The resin, solvent and concentration employed in this Example are same as those in Example 16.

Table 14

| Size of granule | Solution-feeding time | Coating percent | Nitrogen-dissolving out percent in water for 24 hours |
|---|---|---|---|
| 5–6 mm | 15 min | 3.0% | 0.1% |
|  | 10.5 min | 2.1% | 0.6% |
| 4–5 mm | 15 | 3.0 | 0.2 |
|  | 12 | 2.4 | 0.6 |
| 3–4 mm | 15 | 3.0 | 0.5 |
|  | 21 | 4.2 | 0.2 |
| 2–3 mm | 15 | 3 | 4.3 |
|  | 21 | 4.2 | 0.4 |

The coating treatment according to the method of the present invention is possible with the various sizes of granules as above indicated, but those having a large size are commercially advantageous since the coating effect is high even when the coating percent is small.

EXAMPLE 18

(Examples of gel-forming resins other than those of polyolefin)

Using the same apparatus as in Example 8, 5 kg of granular fertilizer used in Example 2 was spouted by the stream of hot air at a flow rate of 4 m³/min, and after the granule temperature reached 60° C, gel-forming solutions shown in Table 15 were fed at a rate of 500 g/min, for 10 minutes to give products having coating percent shown in Table 15. Under these conditions, the temperature of drying air for spout was maintained at 90° C, and the granule temperature was maintained at about 60° C. The nitrogen-dissolving out percents and extent of agglomeration of granules are also shown in Table 15. As evident from this Example, coating treatment can be readily carried out even with gel-forming solutions other than those of polyolefin.

Table 15

| No. | Resin | Solvent | Concentration | Coating percent | N-dissolving out percent after 24 hours | Treating property |
|---|---|---|---|---|---|---|
| 1 | Polymer of vinylidene chloride | Tetrachloroethylene | 3 wt. % | 3% | 0.2% | Good |
| 2 | Copolymer of ethylene-vinyl acetate (A) | " | " | 3 | 5 % | |
| 3 | Copolymer of ethylene-vinyl acetate (B) | " | " | 3 | — | Granule agglomerated; no fluidization occurs |
| 4 | " | Trichloroethylene | " | 3 | 30 % | Good |

(Notes)
Polymer of vinylidene chloride: Saran Wrap (film form), product of Asahi Dow, employed.
Copolymer of ethylene-vinyl (A): contains 5 wt. % of vinyl acetate, product of Asahi Kasei Kogyo K.K. for use in this example.
Copolymer of ethylene-vinyl acetate (B): contains 10% wt. % of vinyl acetate, product of Asahi Kasei Kogyo K.K. for use in this example.

Experiment No. 4 in Table 15 is an example where the temperature of drying hot air for spout was kept at 55° C, and the feed rate of the solution was reduced to 250 g/min (fed for 20 minutes) to carry out coating. Under these conditions, no agglomeration of granules occurred, and coating treatment was possible. With resins containing 15% by weight or more of vinyl acetate, no gel-forming property was exhibited in any cases, and whatever conditions were set, granules were agglomerated during coating, spout stopped and encapsulation of individual granule could not be made. Further, as for the adjustment of solubility by means of surfactants, etc., shown in the Reference Example mentioned below, polyvinylidene chloride has not sufficient degree of freedom in adjustment. In this regard, polyolefins are preferable material for coating fertilizer granules.

REFERENCE EXAMPLE (Adjustment of N-dissolving out percent)
Coated granular fertilizer was prepared under the same conditions as in Example 16 except that a polyethylene resin solution containing 0–15% of a nonioic surfactant (an octaoxyethylene nonylphenyl ether,

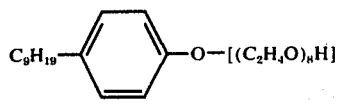

based on the weight of the resin contained in the solution, was used. Test of dissolving out of fertilizer into water, of the product thus obtained was carried out to compare the nitrogen-dissolving out percents. The results are shown in FIG. 4.

As shown in FIG. 4, the method of the present invention will become more effective if it is combined with a conventional method in which dissolving percent can be adjusted by introducing a surfactant or the like in the coating.

COMPARATIVE EXAMPLE 1

(Coating treatment by means of polystyrene solution)
A similar coating treatment to that of Example 9 was carried out by using a solution of a resin readily soluble in a solvent and highly water-resistant. Namely, 5.0 kg of granular fertilizer used in Example 2 was fed and subjected to spouted bed of hot air at a rate of 4 m³/min. After the temperature was elevated to a given value, a given resin solution was fed at a rate of 300 ml/hr to carry out the coating treatment. The resin used in this Example is Stylon No. 679 manufactured by Asahi Dow which is a polystyrene resin having a relatively low molecular weight. As for solvent, toluene was used, and 5%, 2% and 1% solutions of resin were prepared therefrom and used. Further, coating treatment was carried out at granule temperatures of 50°, 60°, 70° and 80° C, and in either cases, agglomeration of granules occurred. Within one minute after the respective resin solutions were fed, fluidization stopped and no capsule could be obtained.

As shown in this Comparative Example, coating treatment by means of a solution of a resin which is highly water-resistant and soluble in solvent, caused agglomeration of granules, and in the case of treatment by means of a rotating drum or the like, the whole of granules formed an agglomerated mass, and further, in the case of fluidized bed treatment, agglomeration of granules occurred when the resin solution was fed, and fluidization stopped. Thus, in either cases, no encapsulation treatment could be effected.

EXAMPLE 19

(Simultaneous use of resins which are not gel-forming ones).
Resins such as polystyrene which are not gel-forming ones are used simultaneously within the limit which does not make the coated granules stick together.
Using the same apparatus as in Example 8, 5 kg of granular fertilizer used in Example 2 was spouted by the stream of hot air at a flow rate of 4 m³/min, and after the granule temperature reached 60° C, solutions of polymers shown in Table 16 were fed at a rate of 500 g/min, for 10 minutes to give products. Under these conditions, the temperature of ejected air for drying was maintained at 90° C, and the granule temperature was maintained at 60° C. The nitrogen dissolving-out percent and extent of agglomeration of granules are shown in Table 16.

In this Example, simultaneous use of resins which are not gel-forming ones could be carried out within the limit of no tendency of agglomeration, and yet in this Example as polystyrene has larger moisture permeability than polyolefin, dissolution rates of the product were higher than those coated with polyolefin alone, and hence this technique is useful for the control of dissolution rate.

The effectiveness of the present invention are summarized as follows:
1. Complete coating can be effected in one step.
2. If general-purpose resins are used as coating material, a small coating percent will be sufficient.
3. Even when the amount of solution fed vs the amount of hot air for drying is larger, no agglomeration of granules occurs, and treatment in a large amount is possible in a short time.
4. For the reason mentioned above in (3), the concentration of solvent in the discharged gas is high, and recovery of solvent can be readily carried out.

What is claimed is:

1. A method for producing slow-releasing granular fertilizer fully coated with water-resisting, transparent, lustrous layer of resin in such a manner that the coated granules do not stick together, which comprises spray- Table 16

| Ratio of Polystyrene[1] | Solution Concentration | Coating percent | Nitrogen-dissolving-out percent after 24 hrs | Treating property |
|---|---|---|---|---|
| 0% (Polyolefin alone) | 3% | 3% | 0.9% | Good |
| 5% | 3% | 3% | 1.3% | Good |
| 25% | 3% | 3% | 2.1% | Good |
| 30% | 3% | 3% | 3.4% | Good |
| 50% | 3% | 3% | 11.5% | Blocks of several granules were formed, but coating was carried out |
| 100% (Polystyrene alone) | 3% | — | — | Granules agglomerated, and thus coating was impossible |

[1]Polystyrene: trade mark Stylon No. 679 manufactured by Asahi Dow, Japan
[2]Polyolefin : Low density polymer (N-7620) manufactured by Asahi Dow, Japan Next, the preferable embodiment and effectiveness of the present invention are summarized as follows:
1. Apparatus: Spouted bed
2. Main coating material: polyethylene, polypropylene (including amorphous one)
3. Additive: waxes (1–50%, preferably 10–30%), resins (30% or less of thermoplastic resin soluble in the below-mentioned solvents)
4. Solvent: toluene, xylene, trichloroethylene and tetrachloroethylene
5. Concentration:
   low density polyethylene, M.I. 20 or higher, 5 wt. % or less; M.I. below 20, 3 wt. % or less;
   high density polyethylene; 2 wt. % or less
   polypropylene:
   amorphous polypropylene 10wt. % or less
   When waxes are added, concentration can be increased corresponding to the extent of addition rate.
6. Size of fertilizer granule: 1–10 mm, preferably 2–6 mm
7. Granule temperature: 40°–100° C, preferably 50°–70° C
8. Temperature of hot air for drying: 130°–50' C, preferably 120°–90° C
9. Flow rate of air at main drying part: (performance in spout air): 15 m/sec or more
10. Amount and pressure of hot air: amount and pressure of air necessary for forming spout
11. Solution-feeding amount: amount calculated from amount, composition and temperature of hot air for drying and discharged gas.

ing a solution having a viscosity of 40 C.P. or less at close to its boiling point of a thermoplastic resin in a hydrocarbon or chlorinated hydrocarbon solvent, upon fertilizer granules, and drying said fertilizer granules upon being sprayed with said solution, continuously and immediately on the spout with hot, dry air at an air speed of at least 15m/sec., said solution having the property capable of forming a solution while it is hot but turning into jelly-like gel when it is cooled and said granules being at a temperature of 40°–90° C during the drying and spraying steps.

2. A method according to claim 1 wherein said thermoplastic resin is at least one kind selected from the group consisting of polyolefins, copolymers of ethylene with vinyl acetate whose content is 5% by weight or less and polyvinylidene chloride.

3. A method according to claim 1 wherein said thermoplastic resin is a polyolefin.

4. A method according to claim 1 wherein said thermoplastic resin is low density polyethylene.

5. A method according to claim 1 wherein said thermoplastic resin is amorphous polypropylene.

6. A method according to claim 1 wherein said solvent has a boiling point in the range of 80°–150° C.

7. A method according to claim 1 wherein said solvent is toluene, xylene, trichloroethylene or tetrachloroethylene.

8. A method according to claim 1 wherein said solvent is tetrachloroethylene.

9. A method according to claim 1 wherein the velocity of said high speed drying hot air is 15 to 40 m/sec or greater.

10. A method for producing slow-releasing granular fertilizer fully coated with water-resisting transparent, lustrous layer of resin in such a manner that the coated granules do not stick together, which comprises spraying a solution having a viscosity of 40 C.P. or lower at close to its boiling point of a thermoplastic resin and an additive thereto, in a hydrocarbon or chlorinated hydrocarbon solvent, upon fertilizer granules, and drying said fertilizer granules upon being sprayed with said solution, continuously and immediately on the spot with hot, dry air at an air speed of at least 15m/sec., said solution having the property capable of forming a solution while it is hot but turning into jelly-like gel when it is cooled, said granules being at a temperature of 40°–90° C during the drying and spraying steps.

11. A method according to claim 10 wherein said additive is a surfactant having oleophilic property.

12. A method according to claim 10 wherein said additive is at least one kind selected from the group consisting of waxes and thermoplastic resins other than said thermoplastic resin and having a higher moisture-permeability than that of said thermoplastic resin.

13. A method according to claim 10 wherein said additive is paraffin wax.

14. A method according to claim 10 wherein said additive is hardened oil.

15. A method according to claim 10 wherein said additive is polystyrene.

* * * * *